US009802255B2

United States Patent
Hen

(10) Patent No.: US 9,802,255 B2
(45) Date of Patent: Oct. 31, 2017

(54) RHOMBUS-SHAPED REVERSIBLE CUTTING INSERT AND SUPPORT SEAT THEREFOR

(71) Applicant: Iscar, Ltd., Tefen (IL)

(72) Inventor: Daniel Hen, Nahariya (IL)

(73) Assignee: Iscar, Ltd., Tefen (IL)

( * ) Notice: Subject to any disclaimer, the term of this patent is extended or adjusted under 35 U.S.C. 154(b) by 225 days.

(21) Appl. No.: 14/742,874

(22) Filed: Jun. 18, 2015

(65) Prior Publication Data

US 2016/0368062 A1    Dec. 22, 2016

(51) Int. Cl.
    *B23B 27/16*    (2006.01)

(52) U.S. Cl.
    CPC .. *B23B 27/1622* (2013.01); *B23B 2200/0447* (2013.01); *B23B 2200/0452* (2013.01); *B23B 2200/085* (2013.01); *B23B 2200/086* (2013.01); *B23B 2200/163* (2013.01); *B23B 2200/165* (2013.01); *B23B 2200/28* (2013.01); *B23B 2200/286* (2013.01); *B23B 2205/12* (2013.01); *B23B 2205/16* (2013.01)

(58) Field of Classification Search
    CPC .......... B23B 27/145; B23B 2200/0447; B23B 2200/0452; B23B 2200/082; B23B 2200/085; B23B 2200/086; B23B 2200/163; B23B 2200/0165; B23B 2200/3627; B23B 2205/12; B23B 2205/16
    See application file for complete search history.

(56) References Cited

U.S. PATENT DOCUMENTS

| 4,340,324 A | 7/1982 | McCreery |
| 7,201,545 B2 | 4/2007 | Ejderklint |
| 7,300,232 B2 * | 11/2007 | Wiman ................ B23B 27/145 407/101 |
| 7,387,474 B2 | 6/2008 | Edler et al. |
| 8,568,064 B2 | 10/2013 | Carl |

(Continued)

FOREIGN PATENT DOCUMENTS

| DE | 19653921 A1 | 7/1997 |
| SU | 1266664 A1 | 10/1986 |

OTHER PUBLICATIONS

Sandvik Coromant Catalog, "Turning tools," *Metalworking Products*, Jan. 31, 2000; pp. 1-3, 6-7, A6-A7, A69-A71.

(Continued)

*Primary Examiner* — Alan Snyder
(74) *Attorney, Agent, or Firm* — Womble Carlyle

(57) ABSTRACT

An assembly of a generally rhombus-shaped reversible cutting insert and a support seat. Each end surface of the cutting insert has a corner abutment surface adjacent each nose cutting edge, at least one inner abutment surface on one side of a lateral plane, and at least one inner abutment surface on the opposite side of the lateral plane, and each corner abutment surface is located closer to a median plane than its adjacent nose cutting edge. In each index position of the cutting insert on the support seat, only one corner abutment surface is in operative contact with one of a plurality of protruding supporting members of the support seat, and only the at least one inner abutment surface located on the opposite side of the lateral plane from the operative corner abutment surface is in contact with the at least one remaining supporting member.

22 Claims, 5 Drawing Sheets

(56) References Cited

U.S. PATENT DOCUMENTS

| | | |
|---|---|---|
| 2006/0083594 A1 | 4/2006 | Ejderklint |
| 2006/0216121 A1 | 9/2006 | Edler et al. |
| 2012/0114435 A1 | 5/2012 | Park |
| 2014/0286717 A1 | 9/2014 | Lof et al. |

OTHER PUBLICATIONS

International Search Report dated Sep. 13, 2016, issued in PCT counterpart application (No. PCT/IL2016/050539).
Written Opinion dated Sep. 13, 2016, issued in PCT counterpart application (No. PCT/IL2016/050539).

* cited by examiner

RHOMBUS-SHAPED REVERSIBLE CUTTING INSERT AND SUPPORT SEAT THEREFOR

FIELD OF THE INVENTION

The present invention relates to an assembly of a generally rhombus-shaped reversible cutting insert and a support seat for use in metal cutting processes in general, and for turning operations in particular.

BACKGROUND OF THE INVENTION

Within the field of cutting tools used in turning operations, there are many examples of reversible cutting inserts removably retained in an insert receiving pocket of a tool holder, either directly or by employing a shim. In some instances, these reversible cutting inserts are configured such the abutment surfaces associated with the opposing end surfaces are lower than the corner cutting edges.

U.S. Pat. No. 8,568,064 discloses a trigonal-shaped double-sided indexable cutting insert and a correspondingly shaped support plate. In one embodiment, the support plate has an upper surface with three separate flat contact surfaces defining an upper central plateau, with the upper central plateau being located above its adjoining transitional faces and upper edges. The upper and lower surfaces of the cutting insert each have three flat contact faces associated with its corner regions, which are recessed with respect to its corner cutting edges, and which are configured to engage the upper central plateau of the support plate in each index position.

US 2012/0114435 discloses a rectangular-shaped double-sided indexable cutting insert and a correspondingly shaped reinforcing part. The reinforcing part has four flat portions formed between the outside of a ring shaped elevated portion and each corner of the rectangle. The upper and lower surfaces of the cutting insert each have four dome-shaped convex portions associated with its corner regions, which are recessed with respect to its corner cutting edges, and at least three of which engage the four flat portions in each index position.

SUMMARY OF THE INVENTION

In accordance with the present invention, there is provided an assembly of a generally rhombus-shaped reversible cutting insert and a support seat, wherein:
the cutting insert comprises two opposing end surfaces interconnected by a continuous peripheral surface, the peripheral side surface having alternating obtuse and acute corner surfaces separated by four side surfaces;
  a median plane located between the two opposing end surfaces and intersecting the peripheral surface, an insert axis perpendicular to the median plane and about which the cutting insert is indexable, a nose cutting edge formed at the intersection of each acute corner surface and each end surface, a longitudinal plane containing the insert axis and bisecting the four nose cutting edges, a nose point located at the intersection of each nose cutting edge and the longitudinal plane, and a lateral plane containing the insert axis and bisecting the two obtuse corner surfaces,
  each end surface having a corner abutment surface adjacent each nose cutting edge and a rake surface located therebetween, at least one inner abutment surface entirely located on one side of the lateral plane, and at least one inner abutment surface entirely located on the opposite side of the lateral plane, and
  each corner abutment surface located closer to the median plane than its adjacent nose point,
the support seat comprises a seat surface with a plurality of supporting members protruding therefrom, each supporting member having a supporting surface in contact with the end surface facing the support seat, and
  wherein in each index position of the cutting insert:
  only one of the two corner abutment surfaces of the end surface facing the support seat is in operative contact with the support seat, at a first supporting surface, and
  only the at least one inner abutment surface of the end surface facing the support seat located on the opposite side of the lateral plane from the operative corner abutment surface is in contact with the support seat at the at least one remaining supporting surface.

Also in accordance with the present invention, there is provided generally rhombus-shaped reversible cutting insert comprising
  two opposing end surfaces interconnected by a continuous peripheral surface, the peripheral side surface having alternating obtuse and acute corner surfaces separated by four side surfaces;
    a median plane located between the two opposing end surfaces and intersecting the peripheral surface,
    an insert axis perpendicular to the median plane and about which the cutting insert is indexable,
    a nose cutting edge formed at the intersection of each acute corner surface and each end surface,
    a longitudinal plane containing the insert axis and bisecting the four nose cutting edges,
    each end surface having a corner abutment surface adjacent each nose cutting edge and a rake surface located therebetween,
    a nose point located at the intersection of each nose cutting edge and the longitudinal plane, and
    each corner abutment surface located closer to the median plane than its adjacent nose point,
  wherein:
  no point on each end surface is located further from the median plane than the two nose points associated therewith,
    the median plane intersects each side surface to form a side boundary line, two side boundary lines converge towards the same acute corner surface to form an acute nose corner angle which is less than 60°, and
    in a cross-sectional view of the cutting insert taken along the longitudinal plane, a first imaginary straight line containing any one of the nose points and a radially outermost point of the adjacent corner abutment surface forms an acute first angle greater than 25° with the median plane.

BRIEF DESCRIPTION OF THE DRAWINGS

For a better understanding, the invention will now be described, by way of example only, with reference to the accompanying drawings in which chain-dash lines represent cut-off boundaries for partial views of a member and in which.

DETAILED DESCRIPTION OF THE INVENTION

Figure 1:
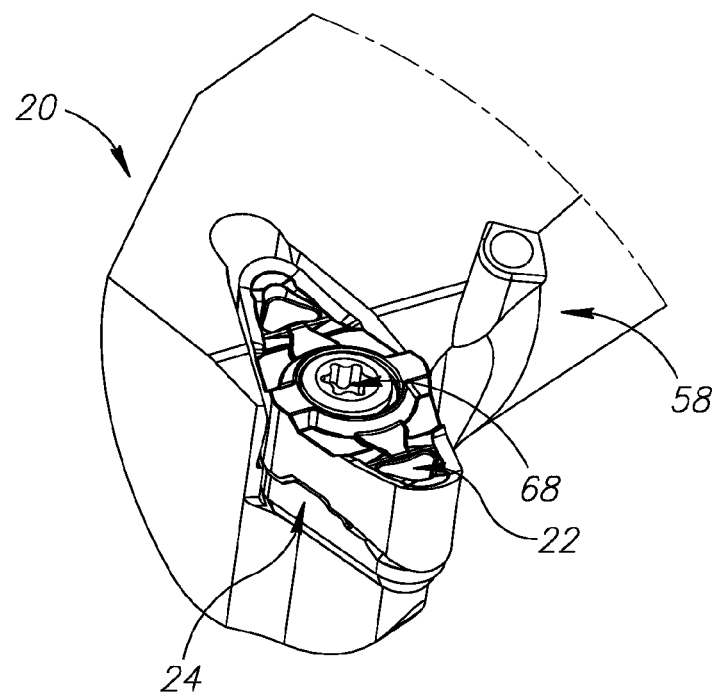
FIG. 1 is a perspective view of an assembly of a cutting insert and a support seat in accordance with some embodiments of the present invention.
Figure 2:
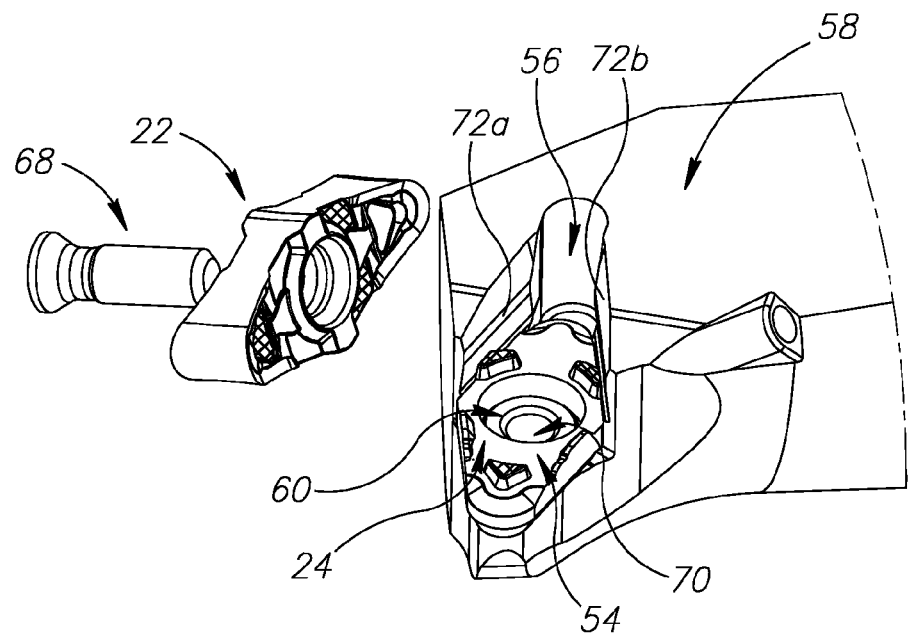
FIG. 2 is an exploded perspective view of the assembly shown in FIG. 1.

The present invention relates to an assembly 20 of a generally rhombus-shaped reversible cutting insert 22 and a support seat 24, as shown in FIGS. 1 and 2.

According to the present invention, the cutting insert 22 has two opposing rhombus-shaped end surfaces 26 interconnected by a continuous peripheral surface 28, with the peripheral side surface 28 having alternating obtuse and acute corner surfaces 30, 32 separated by four side surfaces 34.

Also according to the present invention, a nose cutting edge 36 is formed at the intersection of each acute corner surface 32 and each end surface 26, and each end surface 26 has a corner abutment surface 38 adjacent each nose cutting edge 36 and a rake surface 48 located therebetween.

In some embodiments of the present invention, the cutting insert 22 may preferably be manufactured by form pressing and sintering a cemented carbide, such as tungsten carbide, and may be coated or uncoated.

Figure 3:
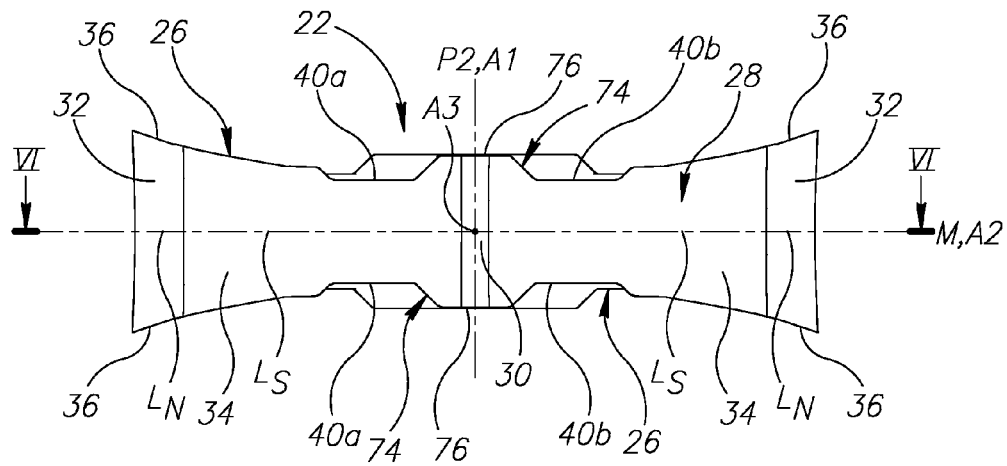
FIG. 3 is a side view of the cutting insert in accordance with some embodiments of the present invention.

As shown in FIG. 3, a median plane M located between the two opposing end surfaces 26 intersects the peripheral surface 28, and the cutting insert 22 is indexable about an insert axis A1 perpendicular to the median plane M. Thus, in addition to being reversible (or "double-sided") in the sense that cutting edges and seating surfaces are provided on both end surfaces 26, each end surface 26 has two cutting sections that are 180° rotationally apart about the insert axis A1.

Figure 4:
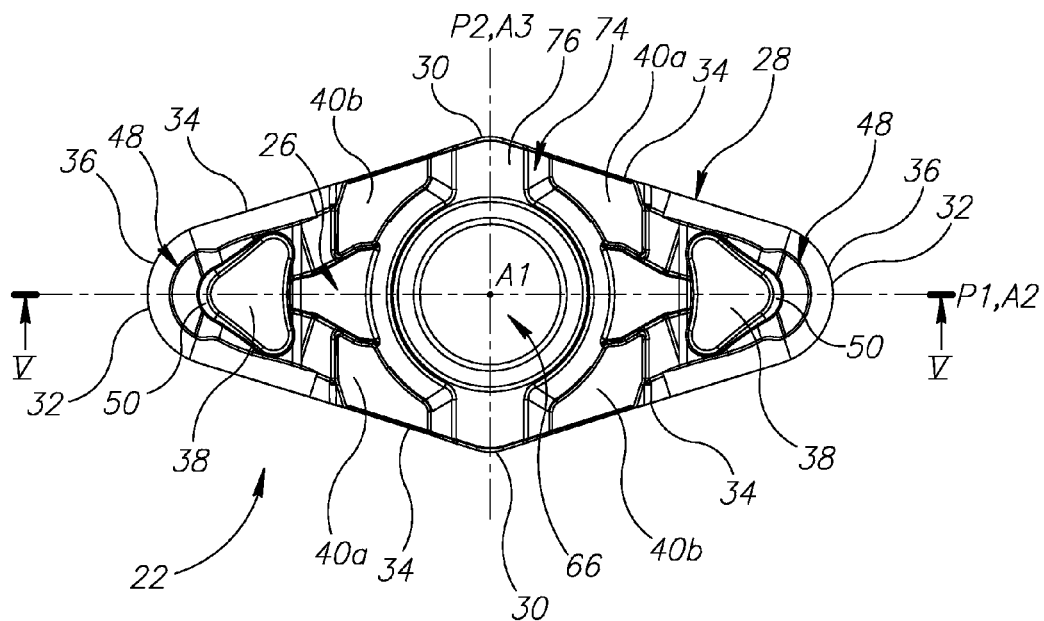
FIG. 4 is an end view of the cutting insert shown in FIG. 3.

Also as shown in FIG. 4, a longitudinal plane P1 containing the insert axis A1 bisects the two acute corner surfaces 32 and the four nose cutting edges 36.

In some embodiments of the present invention, the cutting insert 22 may exhibit mirror symmetry about the median plane M.

Figure 5:
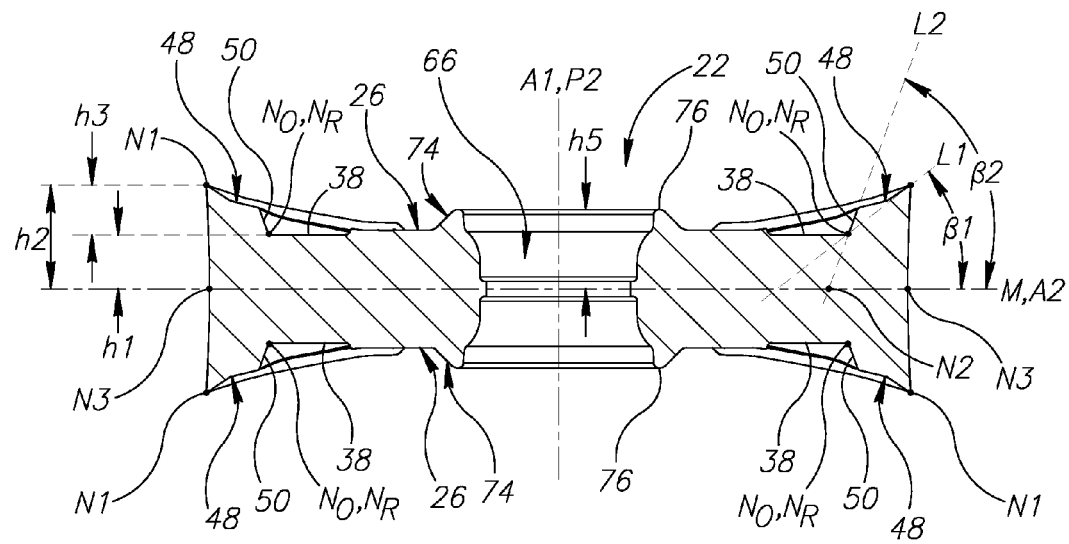
FIG. 5 is a cross-sectional view of the cutting insert shown in FIG. 4, taken along the line V-V.

According to the present invention, as shown in FIG. 5, each corner abutment surface 38 is located closer to the median plane M than a nose point N1 located at the intersection of its adjacent nose cutting edge 36 and the longitudinal plane P1.

In some embodiments of the present invention, no point on each end surface 26 may be located further from the median plane M than the two nose points N1 associated therewith. Also in some embodiments of the present invention, each corner abutment surface 38 may be entirely located closer to the median plane M than any point along its adjacent nose cutting edge 36.

Further in some embodiments of the present invention, the two corner abutment surfaces 38 associated with each end surface 26 may be coplanar and parallel to the median plane M. Yet further in some embodiments of the present invention, a closest point on each end surface 26 from the median plane M may be contained in one of the two corner abutment surfaces 38 associated therewith.

As shown in FIG. 4, the longitudinal plane P1 may bisect the two corner abutment surfaces 38 associated with each end surface 26.

In some embodiments of the present invention, each end surface 26 may have exactly two corner abutment surfaces 38.

Also in some embodiments of the present invention, the cutting insert 22 may exhibit mirror symmetry about the longitudinal plane P1.

Figure 6:
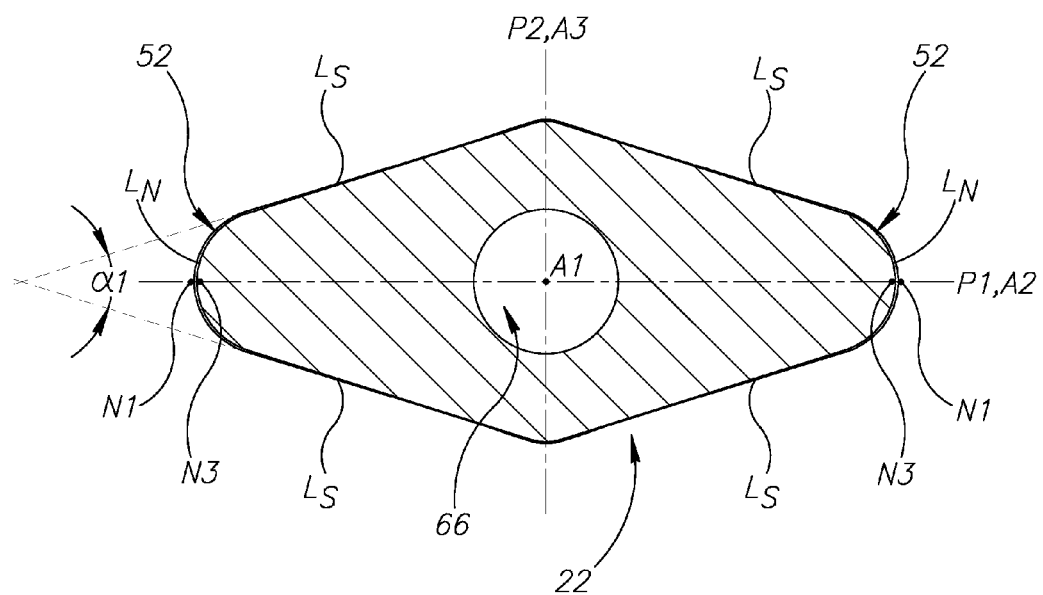
FIG. 6 is a cross-sectional view of the cutting insert shown in FIG. 3, taken along the line VI-VI.

As shown in FIGS. 3 and 6, the median plane M intersects each side surface 34 to form a side boundary line $L_S$, and two side boundary lines $L_S$ converge towards the same acute corner surface 32 to form an acute nose corner angle $\alpha 1$.

In some embodiments of the present invention, the nose corner angle $\alpha 1$ may be less than 60°, and suitable for profiling turning operations.

As shown in FIG. 4, a lateral plane P2 containing the insert axis A1 bisects the two obtuse corner surfaces 30.

In some embodiments of the present invention, the cutting insert 22 may exhibit mirror symmetry about the lateral plane P2.

Also in some embodiments of the present invention, the longitudinal plane P1 may be perpendicular to the lateral plane P2.

And in some embodiments of the present invention, the median plane M, the longitudinal plane P1 and the lateral plane P2 may be mutually perpendicular to one another, with the insert axis A1 being located at the intersection of the longitudinal plane P1 and the lateral plane P2, a longitudinal axis A2 being located at the intersection of the median plane M and the longitudinal plane P1, and a lateral axis A3 being located at the intersection of the median plane M and the lateral plane P2. In some embodiments, the insert may be mirror symmetric about all three planes M, P1 and P2. In some embodiments, the insert may have 180° rotational symmetry about all three axes A1, A2 and A3. In some embodiments, the insert may be mirror symmetric about all three planes M, P1 and P2 and also 180° rotationally symmetric about all three axes A1, A2 and A3.

According to the present invention, as shown in FIG. 4, at least one inner abutment surface 40a, 40b is entirely located on one side of the lateral plane P2, and at least one inner abutment surface 40a, 40b is entirely located on the opposite side of the lateral plane P2.

In some embodiments of the present invention, as shown in FIG. 3, the at least two inner abutment surfaces 40a, 40b associated with each end surface 26 may be coplanar and parallel to the median plane M.

Also in some embodiments of the present invention, as shown in FIGS. 3 and 5, the at least two inner abutment surfaces 40a, 40b associated with each end surface 26 may be entirely located closer to the median plane M than the two nose points N1 associated with the same end surface 26.

Further in some embodiments of the present invention, the two corner abutment surfaces 38 and the at least two inner abutment surfaces 40a, 40b associated with each end surface 26 may be coplanar.

Yet further in some embodiments of the present invention, as shown in FIG. 4, each inner abutment surface 40a, 40b may intersect at least one of the four side surfaces 34.

Still further in some embodiments of the present invention, as shown in FIG. 4, each end surface 26 may have exactly two spaced apart inner abutment surfaces 40a, 40b located on each side of the lateral plane P2.

Figure 7:
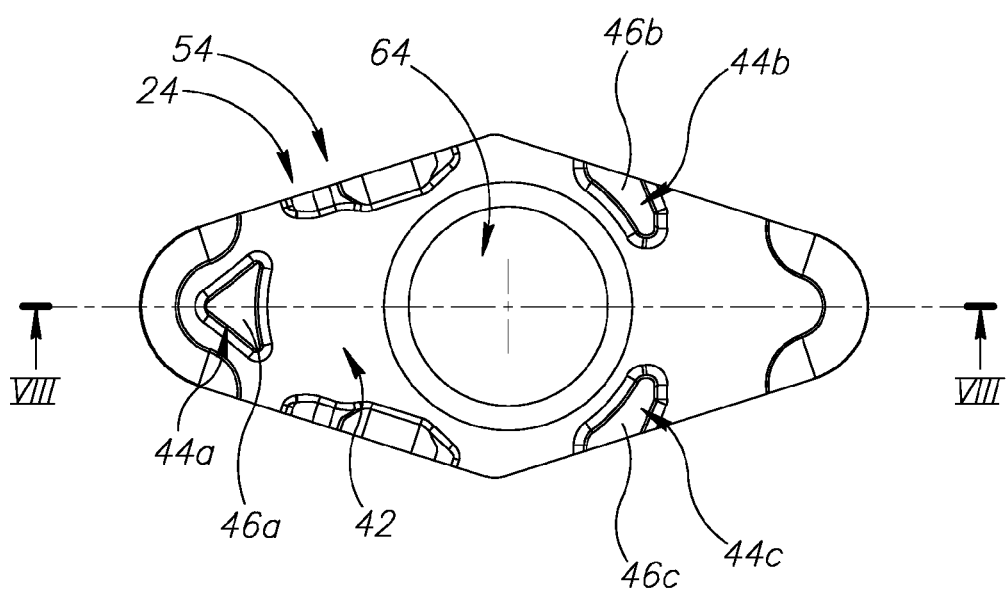
FIG. 7 is a top view of the support seat in accordance with some embodiments of the present invention.
Figure 8:
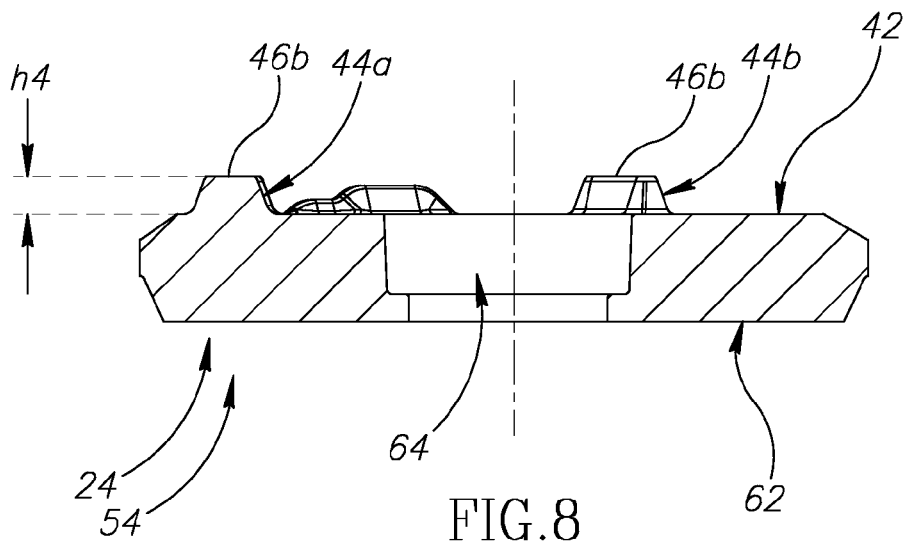
FIG. 8 is a cross-sectional view of the support seat shown in FIG. 7, taken along the line VIII-VIII.

According to the present invention, as shown in FIGS. 2, 7 and 8, the support seat 24 comprises a seat surface 42 with a plurality of supporting members 44a, 44b, 44c protruding therefrom, each supporting member 44a, 44b, 44c having a supporting surface 46a, 46b, 46c in contact with the end surface 26 facing the support seat 24.

It should be appreciated that regions of contact between the cutting insert 22 and the support seat 24 are represented by cross-hatching in FIG. 2.

In some embodiments of the present invention, as shown in FIG. 8, the plurality of supporting surfaces 46a, 46b, 46c may be coplanar.

It should be appreciated that for embodiments of the present invention having coplanar supporting surfaces 46a, 46b, 46c, the support seat 24 can be manufactured with increased efficiency.

According to the present invention, in each index position of the cutting insert 22; only one of the two corner abutment surfaces 38 of the end surface 26 facing the support seat 24 is in operative contact with the support seat 24, at a first supporting surface 46a, and only the at least one inner abutment surface 40a, 40b of the end surface 26 facing the support seat 24 located on the opposite side of the lateral plane P2 from the operative corner abutment surface 38 is in contact with the support seat 24 at the at least one remaining supporting surface 46b, 46c.

In some embodiments of the present invention, as shown in FIG. 2, apart from the operative corner abutment surface 38, no other portion of the end surface 26 facing the support seat 24 and located on the same side of the lateral plane P2 may be in contact with the support seat 24.

It should be appreciated that for embodiments of the present invention having exactly two spaced apart inner abutment surfaces 40a, 40b located on each side of the lateral plane P2, the assembly 20 is configured with exactly three spaced apart contact zones between the end surface 26 facing the support seat 24 and the support seat 24, thus enabling the cutting insert 22 to be retained on the support seat 24 without being over-constrained.

This configuration can be achieved when the two spaced apart inner abutment surfaces 40a, 40b located on the opposite side of the lateral plane P2 from the operative corner abutment surface 38 are in contact with two corresponding supporting surfaces 46b, 46c, as shown in FIGS. 2, 4 and 7, or alternatively, when the two spaced apart inner abutment surfaces 40a, 40b located on the opposite side of the lateral plane P2 from the operative corner abutment surface 38 are in contact with a single supporting surface (not shown in the figures).

In some embodiments of the present invention, a clamping force between the cutting insert 22 and the support seat 24 may be applied at a central region of an imaginary triangle delimited by the three spaced apart contact zones, thus enabling the cutting insert 22 to be retained on the support seat 24 with a high level of stability.

It should also be appreciated that for embodiments of the present invention having a single inner abutment surface (not shown in the figures) located on each side of the lateral plane P2, the assembly 20 may still be configured with exactly three spaced apart contact zones, by virtue of the single inner abutment surface located on the opposite side of the lateral plane P2 from the operative corner abutment surface 38 being in contact with two spaced apart supporting surfaces 46b, 46c.

Figure 9:
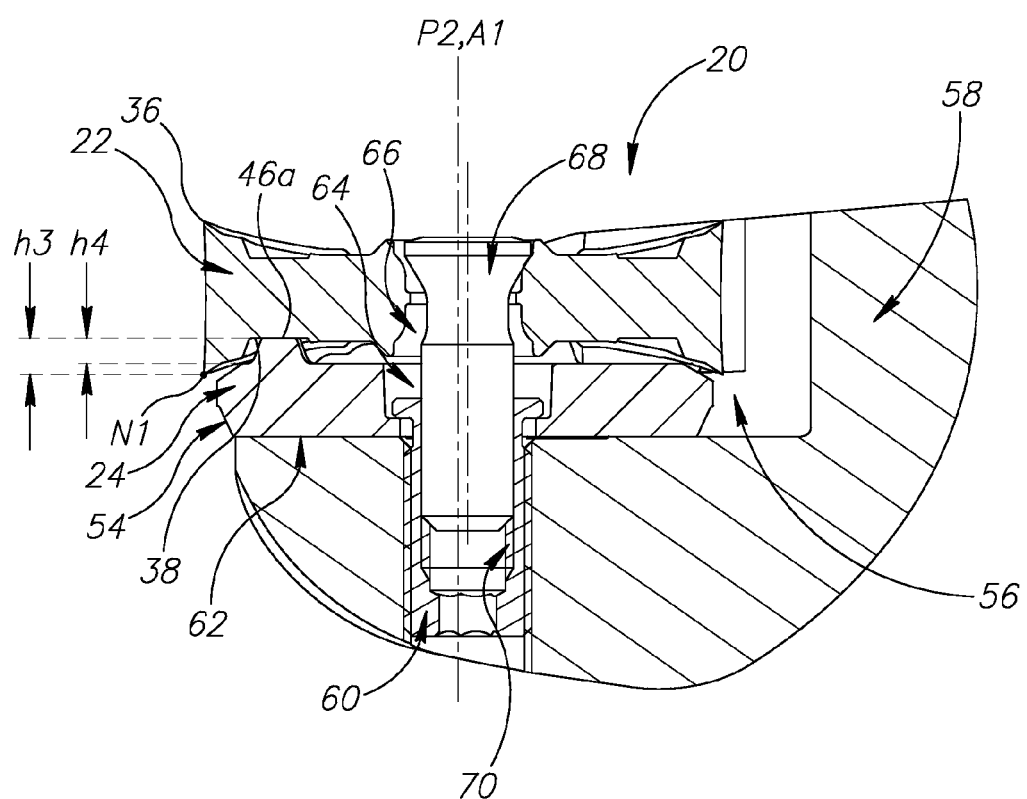
FIG. 9 is a cross-sectional view of the assembly taken along a longitudinal plane.

Also in some embodiments of the present invention, as shown in FIG. 9, the operative nose cutting edge 36 may be located on the opposite end surface 26 from the operative corner abutment surface 38 and on the same side of the lateral plane P2 as the operative corner abutment surface 38. As shown in FIG. 5, in a cross-sectional view of the cutting insert 22 taken along the longitudinal plane P1, a first imaginary straight line L1 containing one of the nose points N1 and a radially outermost point $N_O$ of the adjacent corner abutment surface 38 forms an acute first angle β1 with the median plane M.

In some embodiments of the present invention, the first angle β1 may be greater than 25°. It should be appreciated that for embodiments of the present invention having a first angle β1 greater than 25°, the operative corner abutment surface 38 is advantageously located 'under' the operative nose cutting edge 36, thus enabling the effective transmission of cutting forces through the cutting insert 22 and into the support seat 24.

Effective transmission of cutting forces through the cutting insert 22 and into the support seat 24 is particularly preferable for embodiments of the present invention where the cutting insert 22 has slender nose cutting corners and the nose corner angle α1 is less than 60°.

As shown in FIG. 5, in a cross-sectional view of the cutting insert 22 taken along the longitudinal plane P1, the radially outermost point $N_O$ of each corner abutment surface 38 is located a first height h1 above the median plane M, and each nose point N1 is located a second height h2 above the median plane M.

In some embodiments of the present invention, the first height h1 may be less than three quarters of the second height h2, i.e. $h1 < h2 * \frac{3}{4}$.

It should be appreciated that for embodiments of the present invention having the first height h1 less than three quarters of the second height h2, the cutting insert 22 is advantageously compact in a direction transverse to the median plane M, resulting in reduced material costs and greater suitability for internal turning operations.

In some embodiments of the present invention, as shown in FIGS. 4 and 5, a ramp surface 50 may be located between each rake surface 48 and its associated corner abutment surface 38.

As shown in FIG. 5, in a cross-sectional view of the cutting insert 22 taken along the longitudinal plane P1, a second imaginary straight line L2 tangential to a ramp point $N_R$ on each ramp surface 50 forms an acute second angle β2 with the median plane M.

In some embodiments of the present invention, the second angle β2 may be greater than the first angle β1.

Also, as shown in FIG. 5, each second imaginary straight line L2 intersects the median plane M at an inner axial point N2.

In some embodiments of the present invention, each inner axial point N2 may be located closer to the insert axis A1 than its associated ramp point $N_R$.

Also in some embodiments of the present invention, each ramp surface 50 may extend from its associated rake surface 48 to its associated corner abutment surface 38, and as shown in FIG. 5, in a cross-sectional view of the cutting insert 22 taken along the longitudinal plane P1, the radially outermost point $N_O$ of each corner abutment surface 38 may be coincident with the ramp point $N_R$ of its associated ramp surface 50.

It should be appreciated that for embodiments of the present invention having the second angle β2 greater than the first angle β1, cutting chips flowing across the operative rake surface 48 are advantageously deflected away from the adjacently located non-operative corner abutment surface 38, thus reducing the risk of abrasions and damage which may otherwise negatively affect the positional accuracy and repeatability of the cutting insert 22 when the end surface 26 facing the support seat 24 is reversed and the said non-operative corner abutment surface 38 becomes operative.

In some embodiments of the present invention, each rake surface 48 may extend from its associated nose cutting edge 36 to its associated ramp surface 50, and in a cross-sectional view of the cutting insert 22 taken along the longitudinal plane P1, as shown in FIG. 5, each rake surface 48 may extend continuously towards the median plane M from its associated nose cutting edge 36 to its associated ramp surface 50.

It should be appreciated that for embodiments of the present invention in which the rake surface 48 extends from its associated nose cutting edge 36 to its associated ramp surface 50 and continuously towards the median plane M, the cutting insert 22 can perform turning operations with a positive rake angle and a sharp cutting edge, thus reducing cutting forces and promoting improved chip flow, particularly suitable for machining aluminum. In such configurations, each nose cutting edge 36 is typically honed, having no negative land surface associated therewith.

As shown in FIGS. 3 and 5, the median plane M intersects each acute corner surface 32 to form a nose boundary line $L_N$, and the longitudinal plane P1 intersects each nose boundary line $L_N$ at an outer axial point N3.

In some embodiments of the present invention, as shown in FIG. 5, each outer axial point N3 may be located closer to the insert axis A1 than the two nose points N1 associated with the same acute corner surface 32.

Also in some embodiments of the present invention, each end surface 26 may intersect the peripheral side surface 28 to form a peripheral edge 52, and in a cross-sectional view of the cutting insert 22 taken along the median plane M, as shown in FIG. 6, each nose boundary line $L_N$ may be entirely located inside the visible peripheral edge 52.

It should be appreciated that for embodiments of the present invention having each nose boundary line $L_N$ located inside the peripheral edge 52, the cutting insert 22 takes the form of a double-positive type cutting insert, thus enabling turning operations to be performed with an increased positive rake angle, whilst maintaining sufficient clearance between the acute corner surface 32 and a workpiece (not shown).

As shown in FIGS. 2, 7, 8 and 9, the support seat 24 may be in the form of a shim 54 removably retained in an insert receiving pocket 56 of a tool holder 58 by means of a threaded bushing 60.

In some embodiments of the present invention, the shim 54 may preferably be manufactured from cemented carbide or another material which is harder than the material of the insert receiving pocket 56.

As shown in FIGS. 8 and 9, the shim 54 may have a flat base surface 62 opposing the seat surface 42, and a shim bore 64 may intersect both the base surface 62 and the seat surface 42.

Also as shown in FIG. 9, the threaded bushing 60 may be located in the shim bore 64 and threadingly engage the receiving pocket 56.

In some embodiments of the present invention, as shown in FIGS. 4 and 5, an insert bore 66 may extend coaxially with the insert axis A1 and intersect the two end surfaces 26 of the cutting insert 22.

Also in some embodiments of the present invention, as shown in FIG. 9, a clamping screw 68 may be located in the insert bore 66 and threadingly engage a threaded bore 70 in the threaded bushing 60 to apply the clamping force.

As shown in FIGS. 5, 8 and 9, each nose point N1 is located a third height h3 above its associated corner abutment surface 38, and the first supporting surface 46a is located a fourth height h4 above the seat surface 42.

In some embodiments of the present invention, the third height h3 may be greater than the fourth height h4.

As shown in FIG. 2, the insert receiving pocket 56 may include two pocket walls 72a, 72b transverse to the seat surface 42 of the shim 54.

In some embodiments of the present invention, the two side surfaces 34 of the cutting insert 22 located on the opposite side of the lateral plane P2 from the operative corner abutment surface 38 may be in contact with the two pocket walls 72a, 72b.

Contact between the cutting insert 22 and the two pocket walls 72a, 72b may be generated by the insert bore 66 and the threaded bore 70 being eccentric to each other, and a component of the clamping force from the clamping screw 68 being directed transverse to the insert axis A1.

In some embodiments of the present invention, the shim 54 may be non-indexable.

As shown in FIGS. 1 to 5, each end surface 26 of the cutting insert 22 may have a male-type lateral member 74 extending between and intersecting the two obtuse corner surfaces 30, and each lateral member 74 may have a raised lateral surface 76 having a fifth height h5 above the median plane M.

It should be appreciated that for embodiments of the present invention having the male-type lateral member 74 extending between and intersecting the two obtuse corner surfaces 30, rigidity of the cutting insert 22 is improved, such that deformations and inaccuracies resulting from the sintering process of the cutting insert 22 are reduced to a minimum.

In some embodiments of the present invention, as shown in FIGS. 3 and 5, each raised lateral surface 76 may be located closer to the median plane M than the two nose points N1 associated with the same end surface 26 (i.e., h2>h5), and each raised lateral surface 76 may be located further from the median plane M than the at least two inner abutment surfaces 40a, 40b of the same end surface 26.

Also in some embodiments of the present invention, the raised lateral surface 76 may be parallel to the median plane M.

Further in some embodiments of the present invention, as shown in FIG. 5, the insert bore 66 may intersect the raised lateral surface 76 of each lateral member 74.

Configuring the insert bore 66 to intersect the raised lateral surface 76 of each lateral member 74 enables the inclusion of a countersink in the insert bore 66 to receive the head of the clamping screw 68, as shown in FIG. 9, which thus protects the clamping screw 68 from abrasions and damage from cutting chips flowing across the end surface 26 of the cutting insert 22 associated with the operative nose cutting edge 36.

Although the present invention has been described to a certain degree of particularity, it should be understood that various alterations and modifications could be made without departing from the spirit or scope of the invention as hereinafter claimed.

What is claimed is:
1. An assembly (20) of a generally rhombus-shaped reversible cutting insert (22) and a support seat (24), wherein:
   the cutting insert (22) comprises:
      two opposing end surfaces (26) interconnected by a continuous peripheral side surface (28), the periph- eral side surface (28) having alternating obtuse and acute corner surfaces (30, 32) separated by four side surfaces (34);

a median plane (M) located between the two opposing end surfaces (26) and intersecting the peripheral side surface (28), an insert axis (A1) perpendicular to the median plane (M) and about which the cutting insert (22) is indexable, a nose cutting edge (36) formed at the intersection of each acute corner surface (32) and each end surface (26), a longitudinal plane (P1) containing the insert axis (A1) and bisecting the four nose cutting edges (36), a nose point (N1) located at the intersection of each nose cutting edge (36) and the longitudinal plane (P1) and a lateral plane (P2) containing the insert axis (A1) and bisecting the two obtuse corner surfaces (30), each end surface (26) having a corner abutment surface (38) adjacent each nose cutting edge (36) and a rake surface (48) located therebetween, at least one inner abutment surface (40a, 40b) entirely located on one side of the lateral plane (P2), and at least one inner abutment surface (40a, 40b) entirely located on the opposite side of the lateral plane (P2), and each corner abutment surface (38) located closer to the median plane (M) than its adjacent nose point (N1), the support seat (24) comprises a seat surface (42) with a plurality of supporting members (44a, 44b, 44c) protruding therefrom, each supporting member (44a, 44b, 44c) having a supporting surface (46a, 46b, 46c) in contact with the end surface (26) facing the support seat (24), and wherein in each index position of the cutting insert (22):

only one of the two corner abutment surfaces (38) of the end surface (26) facing the support seat (24) is in operative contact with the support seat (24), at a first supporting surface (46a), and only the at least one inner abutment surface (40a, 40b) of the end surface (26) facing the support seat (24) located on the opposite side of the lateral plane (P2) from the operative corner abutment surface (38) is in contact with the support seat (24) at the at least one remaining supporting surface (46b, 46c).

2. The assembly (20) according to claim 1, wherein each corner abutment surface (38) is entirely located closer to the median plane (M) than any point along its adjacent nose cutting edge (36).

3. The assembly (20) according to claim 1, wherein the two corner abutment surfaces (38) associated with each end surface (26) are coplanar and parallel to the median plane (M).

4. The assembly (20) according to claim 1, wherein the at least two inner abutment surfaces (40a, 40b) associated with each end surface (26) are entirely located closer to the median plane (M) than the two nose points (N1) associated with the same end surface (26).

5. The assembly (20) according to claim 1, wherein each end surface (26) has exactly two spaced apart inner abutment surfaces (40a, 40b) located on each side of the lateral plane (P2).

6. The assembly (20) according to claim 1, wherein apart from the operative corner abutment surface (38), no other portion of the end surface (26) facing the support seat (24) and located on the same side of the lateral plane (P2) is in contact with the support seat (24).

7. The assembly (20) according to claim 1, wherein the operative nose cutting edge (36) is located on the opposite end surface (26) from the operative corner abutment surface (38) and on the same side of the lateral plane (P2) as the operative corner abutment surface (38).

8. The assembly (20) according to claim 1, wherein the median plane (M) intersects each side surface (34) to form a side boundary line (LS), wherein two side boundary lines (LS) converge towards the same acute corner surface (32) to form an acute nose corner angle ($\alpha 1$) less than 60°.

9. The assembly (20) according to claim 1, wherein each end surface (26) has a male-type lateral member (74) extending between and intersecting the two obtuse corner surfaces (30), and wherein each lateral member (74) has a raised lateral surface (76).

10. The assembly (20) according to claim 1, wherein only the at least one inner abutment surface (40a, 40b) of the end surface (26) facing the support seat (24) located on the opposite side of the lateral plane (P2) from the operative corner abutment surface (38) is in contact with the support seat (24) at two spaced apart supporting surfaces (46b, 46c).

11. An assembly (20) of a generally rhombus-shaped reversible cutting insert (22) and a support seat (24), wherein:

the cutting insert (22) comprises:

two opposing end surfaces (26) interconnected by a continuous peripheral side surface (28), the peripheral side surface (28) having alternating obtuse and acute corner surfaces (30, 32) separated by four side surfaces (34);

a median plane (M) located between the two opposing end surfaces (26) and intersecting the peripheral side surface (28), an insert axis (A1) perpendicular to the median plane (M) and about which the cutting insert (22) is indexable, a nose cutting edge (36) formed at the intersection of each acute corner surface (32) and each end surface (26), a longitudinal plane (P1) containing the insert axis (A1) and bisecting the four nose cutting edges (36), a nose point (N1) located at the intersection of each nose cutting edge (36) and the longitudinal plane (P1) and a lateral plane (P2) containing the insert axis (A1) and bisecting the two obtuse corner surfaces (30), each end surface (26) having a corner abutment surface (38) adjacent each nose cutting edge (36) and a rake surface (48) located therebetween, at least one inner abutment surface (40a, 40b) entirely located on one side of the lateral plane (P2), and at least one inner abutment surface (40a, 40b) entirely located on the opposite side of the lateral plane (P2), and each corner abutment surface (38) located closer to the median plane (M) than its adjacent nose point (N1), the support seat (24) comprises a seat surface (42) with a plurality of supporting members (44a, 44b, 44c) protruding therefrom, each supporting member (44a, 44b, 44c) having a supporting surface (46a, 46b, 46c) in contact with the end surface (26) facing the support seat (24), wherein in a cross-sectional view of the cutting insert (22) taken along the longitudinal plane (P1), a first imaginary straight line (L1) containing any one of the nose points (N1) and a radially outermost point ($N_O$) of the adjacent corner abutment surface (38) forms an acute first angle ($\beta 1$) greater than 25° with the median plane (M); and wherein in each index position of the cutting insert (22):

only one of the two corner abutment surfaces (38) of the end surface (26) facing the support seat (24) is in operative contact with the support seat (24), at a first supporting surface (46a), and only the at least one inner abutment surface (40a, 40b) of the end surface (26) facing the support seat (24) located on the opposite side of the lateral plane (P2) from the operative corner abutment surface (38) is in contact with the support seat (24) at the at least one remaining supporting surface (46b, 46c).

12. The assembly (20) according to claim 11, wherein a ramp surface (50) is located between each rake surface (48) and its associated corner abutment surface (38),
wherein in a cross-sectional view of the cutting insert (22) taken along the longitudinal plane (P1), a second imaginary straight line (L2) tangential to a ramp point ($N_R$) on the ramp surface (50) forms an acute second angle (β2) with the median plane (M), and
wherein the second angle (β2) is greater than the first angle (β1).

13. The assembly (20) according to claim 12,
wherein each rake surface (48) extends from its associated nose cutting edge (36) to its associated ramp surface (50), and
wherein in a cross-sectional view of the cutting insert (22) taken along the longitudinal plane (P1), each rake surface (48) extends continuously towards the median plane (M) from its associated nose cutting edge (36) to its associated ramp surface (50).

14. A generally rhombus-shaped reversible cutting insert (22) comprising:
two opposing end surfaces (26) interconnected by a continuous peripheral side surface (28), the peripheral side surface (28) having alternating obtuse and acute corner surfaces (30, 32) separated by four side surfaces (34);
a median plane (M) located between the two opposing end surfaces (26) and intersecting the peripheral side surface (28),
an insert axis (A1) perpendicular to the median plane (M) and about which the cutting insert (22) is indexable,
a nose cutting edge (36) formed at the intersection of each acute corner surface (32) and each end surface (26),
a longitudinal plane (P1) containing the insert axis (A1) and bisecting the four nose cutting edges (36),
each end surface (26) having a corner abutment surface (38) adjacent each nose cutting edge (36) and a rake surface (48) located therebetween,
a nose point (N1) located at an intersection of each nose cutting edge (36) and the longitudinal plane (P1), and
each corner abutment surface (38) located closer to the median plane (M) than its adjacent nose point (N1), wherein:
no point on each end surface (26) is located further from the median plane (M) than the two nose points (N1) associated therewith,
the median plane (M) intersects each side surface (34) to form a side boundary line ($L_S$), two side boundary lines ($L_S$) converge towards the same acute corner surface (32) to form an acute nose corner angle (α1) which is less than 60°, and
in a cross-sectional view of the cutting insert (22) taken along the longitudinal plane (P1), a first imaginary straight line (L1) containing any one of the nose points (N1) and a radially outermost point ($N_O$) of the adjacent corner abutment surface (38) forms an acute first angle (β1) greater than 25° with the median plane (M).

15. The cutting insert (22) according to claim 14,
wherein the radially outermost point ($N_O$) of each corner abutment surface (38) is located a first height (h1) above the median plane (M), and each nose point (N1) is located a second height (h2) above the median plane (M), and
wherein the first height (h1) is less than three quarters of the second height (h2).

16. The cutting insert (22) according to claim 14, wherein a closest point on each end surface (26) from the median plane (M) is contained in one of the two corner abutment surfaces (38) associated therewith.

17. The cutting insert (22) according to claim 14,
wherein a ramp surface (50) is located between each rake surface (48) and its associated corner abutment surface (38),
wherein in a cross-sectional view of the cutting insert (22) taken along the longitudinal plane (P1), a second imaginary straight line (L2) tangential to a ramp point ($N_R$) on the ramp surface (50) forms an acute second angle (β2) with the median plane (M), and
wherein the second angle (β2) is greater than the first angle (β1).

18. The cutting insert (22) according to claim 17,
wherein each rake surface (48) extends from its associated nose cutting edge (36) to its associated ramp surface (50), and
wherein in a cross-sectional view of the cutting insert (22) taken along the longitudinal plane (P1), each rake surface (48) extends continuously towards the median plane (M) from its associated nose cutting edge (36) to its associated ramp surface (50).

19. The cutting insert (22) according to claim 17,
wherein each second imaginary straight line (L2) intersects the median plane (M) at an inner axial point (N2), and
wherein each inner axial point (N2) is located closer to the insert axis (A1) than its associated ramp point ($N_R$).

20. The cutting insert (22) according to claim 14, wherein each corner abutment surface (38) is entirely located closer to the median plane (M) than any point along its adjacent nose cutting edge (36).

21. The cutting insert (22) according to claim 14, wherein the two corner abutment surfaces (38) associated with each end surface (26) are coplanar and parallel to the median plane (M).

22. The cutting insert (22) according to claim 14, further comprising:
a lateral plane (P2) containing the insert axis (A1) and bisecting the two obtuse corner surfaces (30),
a longitudinal axis (A2) defined at the intersection of the median plane (M) and the longitudinal plane (P1),
a lateral axis (A3) defined at the intersection of the median plane (M) and the lateral plane (P2); and wherein:
the median plane (M), the longitudinal plane (P1) and the lateral plane (P2) are mutually perpendicular to one another;
the cutting insert (22) is mirror symmetric about all three of the median plane (M), the longitudinal plane (P1) and the lateral plane (P2); and
the cutting insert (22) has 180° rotational symmetry about all three of the insert axis (A1), longitudinal axis (A2) and the lateral axis (A3).

* * * * *